(12) United States Patent
Morin et al.

(10) Patent No.: US 8,011,291 B2
(45) Date of Patent: Sep. 6, 2011

(54) MACHINE FOR PREPARING AN INFUSION

(75) Inventors: Gilles Morin, Sainte Honorine du Fay (FR); Gerard Brunee, Conde sur Sarthe (FR)

(73) Assignee: SEB S.A., Ecully (FR)

( * ) Notice: Subject to any disclaimer, the term of this patent is extended or adjusted under 35 U.S.C. 154(b) by 771 days.

(21) Appl. No.: 12/064,479

(22) PCT Filed: Jul. 12, 2006

(86) PCT No.: PCT/FR2006/001736
§ 371 (c)(1),
(2), (4) Date: May 27, 2008

(87) PCT Pub. No.: WO2007/026059
PCT Pub. Date: Mar. 8, 2007

(65) Prior Publication Data
US 2008/0229933 A1    Sep. 25, 2008

(30) Foreign Application Priority Data

Aug. 31, 2005  (FR) ...................................... 05 08933

(51) Int. Cl.
*A47J 31/36* (2006.01)
*A47J 31/40* (2006.01)

(52) U.S. Cl. .................................................. 99/302 R

(58) Field of Classification Search .................... 99/287, 99/289 R, 302 R; *A47J 31/04, 31/36, 31/40*
See application file for complete search history.

(56) References Cited

U.S. PATENT DOCUMENTS

| 2004/0107841 | A1  | 6/2004 | Cai |
| 2004/0241307 | A1* | 12/2004 | Knitel ........................... 426/594 |
| 2005/0076783 | A1* | 4/2005 | Kodden et al. ................... 99/275 |

(Continued)

FOREIGN PATENT DOCUMENTS

CH          596810 A5     3/1978
(Continued)

OTHER PUBLICATIONS

Dec. 5, 2006 International Search Report in corresponding PCT/FR2006/001736.

*Primary Examiner* — Henry Yuen
*Assistant Examiner* — Mark Woodall
(74) *Attorney, Agent, or Firm* — Young & Thompson

(57) ABSTRACT

A machine for preparing an infusion includes: an infusion chamber (14) delimited by a lower vessel (3) and an upper packing head (6) that can move relative to one another; a supply of hot pressurized water to the infusion chamber, the packing head (6) having an inner conduit (26) having an inlet (27) that communicates with the infusion chamber and enabling the infusion to pass through the packing head (6) in an upward direction toward the distribution outlet, and; elements (30) located inside the conduit (26) in the vicinity of its inlet and configured for forming the foam in the infusion when passing through the packing head (6) and for preventing the infusion from returning into the infusion chamber. These elements are formed by a deformable flexible piece (30) passed through by at least one hole (35) calibrated for forming the foam and for preventing the infusion from returning.

14 Claims, 2 Drawing Sheets

U.S. PATENT DOCUMENTS

| | | | | |
|---|---|---|---|---|
| 2005/0189439 A1* | 9/2005 | Brouwer et al. | | 239/461 |
| 2005/0260310 A1* | 11/2005 | Noordhuis | | 426/425 |
| 2006/0117960 A1* | 6/2006 | Fischer | | 99/279 |
| 2006/0230942 A1* | 10/2006 | Noordhuis | | 99/275 |
| 2008/0264266 A1* | 10/2008 | Carbonini et al. | | 99/289 R |
| 2009/0029021 A1* | 1/2009 | Nielsen et al. | | 426/433 |

FOREIGN PATENT DOCUMENTS

| | | |
|---|---|---|
| DE | 202004018776 U1 | 2/2005 |
| EP | 1 319 357 A2 | 12/2002 |
| WO | 2004/023948 A | 3/2004 |
| WO | WO 2006/008763 A1 * | 1/2006 |

\* cited by examiner

MACHINE FOR PREPARING AN INFUSION

BACKGROUND OF THE INVENTION

1. Field Of The Invention

This invention relates to a machine for preparing an infusion and, in particular but not exclusively, for preparing coffee.

More particularly, the invention relates to an infusion preparation machine that comprises an infusion chamber that is designed to receive a product to be infused and that is delimited by a lower vat and a so-called upper tamping head that move relative to one another, and a supply of pressurized hot water to the infusion chamber, whereby said tamping head comprises an internal tube that has an inlet that communicates with the infusion chamber and that makes possible the passage of the infusion through the tamping head in an upward direction toward a distribution outlet, and means that are located in said tube close to its inlet and suitable for forming foam in the infusion during its passage through the tamping head and for preventing the infusion from returning into said infusion chamber.

2. Description Of The Related Art

Such a machine is known from the document DE-U-20 2004 018 776, which relates to an espresso-type coffeemaker that comprises foam-forming means arranged in a vertical internal tube of the tamping head. These means consist of a valve that comprises a seat that is formed in the wall of the internal tube, a ball with a diameter that is suitable for resting in a sealed manner on the seat, and an open coil spring that is combined with a stop and pushes the ball against the seat. As indicated in this document, these means that form a valve make possible the formation of foam in the coffee. They also keep the coffee that is located above the ball from returning into the chamber after the percolation operation because of the spring pushing the ball against the seat.

These means that form a valve, however, use several parts that are expensive and difficult to install and that require a precise machining in the internal tube of the tamping head to form the seat against which the ball can rest in a sealed manner. This increases, of course, the production cost of the coffeemaker, primarily when it is desired to produce the latter on a large scale by reducing the production stages as much as possible. The effectiveness of these means that form a valve can also decrease after a large number of operating cycles if coffee deposits are formed at the level of the moving parts, in particular between the ball and its seat.

SUMMARY OF THE INVENTION

This invention has as its object to remedy the above-mentioned drawbacks by proposing means that both allow the foam to form in the infusion and keep the infusion contained in the internal tube from returning to the infusion chamber, which are simple, inexpensive and reliable.

For this purpose, this invention has as its object a machine of the above-mentioned type, characterized in that said means are formed by a deformable flexible part that is pierced by at least one calibrated orifice to form the foam and to keep the infusion from returning.

The foam-forming and nonreturn means of the infusion are thus formed by a single part that can be produced on a large scale at low cost. The space occupied by this part is reduced in particular relative to a valve system with a ball and a spring, and it has high reliability because of the absence of any moving element in its structure. In addition, this part is placed close to the inlet of the internal tube, and even at the very inlet of the latter, and consequently, the infusion residue that is able to return to the infusion chamber is almost non-existent.

In preferred embodiments of the invention, there is also recourse to one and/or the other of the following arrangements:

- The flexible part has the shape of a plate that has lower and upper faces into each of which the orifice empties, and the opening of the orifice in said lower face has a section that is higher than that of the opening of said orifice in said upper face;
- The orifice has the shape of a slightly elongated slot, whereby the openings of said orifice in the lower and upper faces of the plate have an approximately rectangular section;
- The opening of the orifice in the lower face of the plate has a width of between 0.5 and 1 mm and preferably 0.8 mm, and a length of between 1 and 2 mm, and preferably 1.4 mm, and the opening of the orifice in the upper face of the plate has a width of between 0.1 and 0.4 mm, and preferably 0.3 mm, and a length of between 0.6 and 1.5 mm, and preferably 0.9 mm;
- The calibrated orifice has, from the lower face of the plate up to its upper face, a first continually decreasing section portion followed by a second constant section portion;
- The orifice has, from the lower face to the upper face of the plate, a total height of between 1.5 and 2.5 mm, and preferably 2 mm, whereby the first portion of the orifice has a height of between 1 and 1.5 mm, and preferably 1.3 mm, and the second portion of the orifice has a height of between 0.4 and 1 mm, and preferably 0.7 mm;
- The orifice consists of an approximately circular basin that extends from the lower face of the plate and is lengthened by a cylindrical hole that is approximately coaxial to said basin and that extends up to the upper face of the plate;
- The cylindrical hole has a height of between 0.6 and 1.2 mm, and preferably 0.9 mm, and a diameter of between 0.5 and 0.7 mm, and preferably 0.6 mm;
- The flexible part is made of a silicone that has a Shore hardness of between 60 and 70, and preferably 65;
- The flexible part has at least one keying element that is suitable for working with a corresponding relief of the tamping head.

BRIEF DESCRIPTION OF THE DRAWING FIGURES

Other characteristics and advantages of the invention will emerge during the following description, provided by way of nonlimiting example, with reference to the accompanying drawings, in which.

DETAILED DESCRIPTION OF THE INVENTION

In the different figures, identical references to designate identical or similar elements are preserved.

Figure 1:
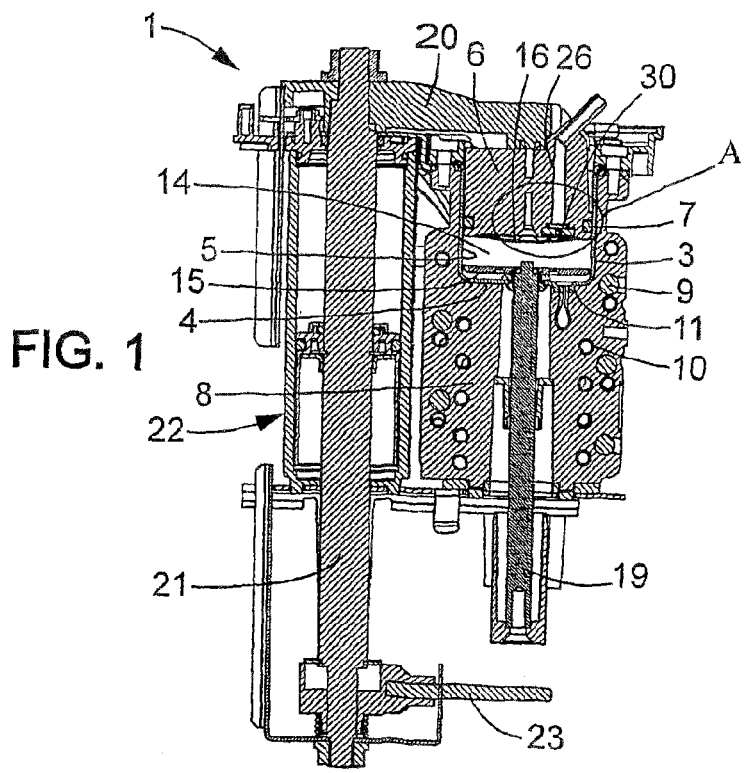
FIG. 1 is a simplified cutaway view of an infusion group of a coffeemaker that comprises a flexible foam-forming and nonreturn part according to a first embodiment of the invention.

An infusion group 1 that is installed inside a housing, not shown, of a machine for preparing an infusion is shown in FIG. 1. The group 1 is designed in particular to prepare a coffee infusion, but it may also be suitable for preparing tea, warm milk, a mixture of these drinks, or any other type of infusion that is prepared by passing hot water though a powdered product to be infused.

The infusion group 1 comprises a lower vat 3 with a vertical axis that has a bottom 4 and an inside cylindrical wall 5 along which an upper tamping head 6 slides vertically and in a sealed manner using an O-ring seal 7 that is provided between the periphery of the tamping head 6 and the inside wall 5 of the vat 3.

The infusion group 1 also comprises a heating block 8, with a vertical axis, that can house the vat 3 in its upper part and that contains an electric heating element 9 and a water pipe 10. The pipe 10 is connected to a water circuit by means of a pump, not shown, which makes it possible to put the water under a pressure on the order of 15 bar. The pipe 10 has an opening 11 that is located in the bottom 4 of the lower vat 3, which forms a supply of pressurized hot water.

Figure 2:
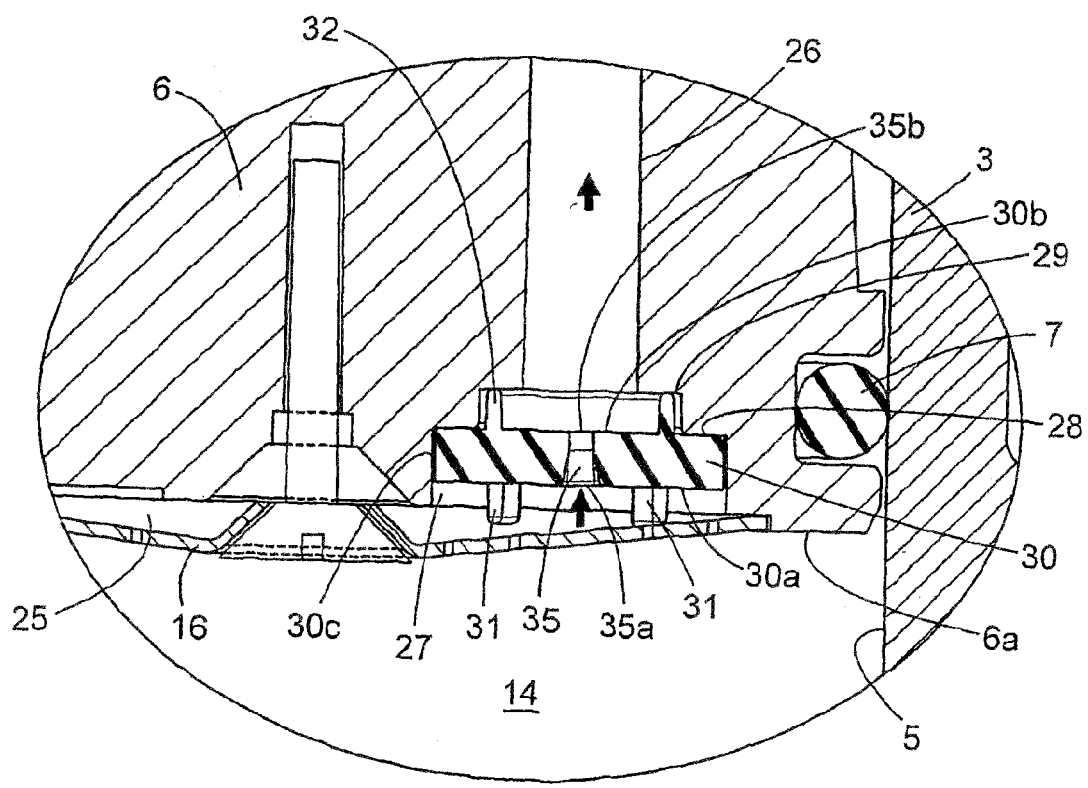
FIG. 2 is a view on a larger scale of the detail A of FIG. 1.

The tamping head 6 has a lower end face 6a, a better view of which is given in FIG. 2, which delimits an infusion chamber 14 with a vertical axis with a portion of the cylindrical wall 5 and the bottom 4 of the vat 3. The infusion chamber 14 comprises a lower perforated grid 15 that is located on the side of the bottom 4 of the vat 3 and an upper perforated grid 16 that is fastened by a screw against the end face 6a of the tamping head 6.

Against its upper face, the lower perforated grid 15 supports the product to be infused, namely the loose coffee grounds in this embodiment, and hot water coming from the heating block 8 passes through it. The lower grid 15 is fastened on a rod 19 that is mounted to slide through the heating block 8, so that the lower grid 15 can be moved vertically.

The upper grid 16 is analogous at all points to the lower grid 15 and defines with the latter the infusion chamber 14.

As shown in FIG. 1, the tamping head 6 is carried by an arm 20 that is fastened to an internal piston 21 of a hydraulic jack 22 that makes it possible to slide the upper tamping head 6 vertically into the infusion chamber 14 to tamp the grounds contained in the latter.

A pin 23 is mounted to move around the lower end of the piston 21 of the jack 22 and is designed to work with the lower end of the rod 19 during the lifting of the jack to lift the latter simultaneously and to compress a spring (not shown) that is connected to the rod 19 so as to move the lower grid 15 upward.

As can be better seen in FIG. 2, a collecting chamber 25 is formed between the end face 6a of the tamping head 6 and the upper face of the upper perforated grid 16. In contrast, an internal tube 26 at the tamping head 6 extends vertically through the tamping head from an inlet 27 that is located in the collecting chamber 25. This inlet 27 consists of the opening of the internal tube 26 in the portion of the end face 6a of the tamping head that delimits the collecting chamber 25. The internal tube 26 is connected at its outlet to outlet pipes (not shown) that orient the coffee toward the outside where it is collected in one or more cups.

The operation of the infusion group is briefly described below, but for more detail, it is possible to refer to the document WO-A-99/12457. An automatic coffee preparation sequence begins starting from a position in which the tamping head 6 is raised so as to release the infusion chamber 14, and in which the lower perforated grid 14 is arranged close to the bottom 4 of the vat 3 in a lowered position as shown in FIG. 1. The coffee grounds are then poured out through a discharge spout, not shown, into the infusion chamber 14. Then, the tamping head 6 is lowered using the hydraulic jack 22 until taking the position shown in FIG. 1. During this lowering movement, the coffee grounds are tamped between the lower and upper grids (15, 16). Pressurized hot water is then supplied to the infusion chamber 14 by the heating block 8 and passes through the grounds in an upward movement. The drink that is obtained is collected beyond the upper grid 16 in the collecting chamber 25, then it passes into the vertical internal tube 26 of the tamping head 6 and flows through the outlet pipes into a cup outside of the machine. Once the infusion operation has ended, the tamping head 6 is lifted to its initial position using the hydraulic jack 22. During the lifting of the jack, the moving pin 23 works with the lower end of the rod 19 to lift the latter by compressing the spring that is combined with it. The lower grid 15 that supports the used coffee grounds is moved upward by the rod 19 to occupy a position in which it is flush with the opening of the lower vat 3. The used coffee grounds are then ejected into a grounds dump box, for example by means of a scraper, not shown. Once the used coffee grounds are evacuated, the pin 23 pivots and releases the lower end of the rod 19 so that the lower grid 15 is returned to its lowered position under the action of the spring combined with the rod.

As can be better seen in FIG. 2, a part 30 is arranged in the immediate proximity of the inlet 27 of the internal tube 26 of the tamping head 6.

The part 30 is made of a flexible material and is deformable under the action of the increase of pressure in the infusion chamber 14 when the latter is supplied with hot water. Preferably, the material that constitutes this part is an elastomer. More particularly, in a preferred embodiment, the part 30 is an alimentary silicone that has a Shore hardness of between 60 and 70, and preferably 65, to impart to the latter a certain deformation taking into account operating pressures. The part 30 that is made of silicone is produced by molding, which makes it possible to produce it on a large scale with precise dimensions and at low cost.

Figure 3:
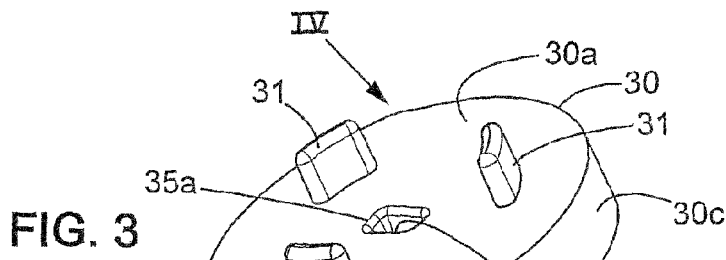
FIG. 3 is a perspective view of the flexible part that is produced according to the first embodiment.

The deformable flexible part 30, FIGS. 2 and 3, consists of a plate that has here the shape of a disk that has a lower face 30a that is located on the side of the infusion chamber 14, an upper face 30b and a lateral face 30c with a height that is clearly less than the dimensions of said lower and upper faces.

In FIG. 2, the periphery of the upper face 30b of the flexible part 30 rests against a radial shoulder 28 that is formed in the tube 26, close to the inlet 27 of the latter. The lower face 30a of the part 30 comprises projecting studs 31, a better view of which is given in FIG. 3; in the embodiment shown, the studs 31 are three in number and are arranged in a circle that is concentric to the lower face 30a by being distributed equiangularly.

When the upper grid 16 is fastened to the tamping head 6, the latter rests against the top of at least a portion of the studs 31, which holds the periphery of the upper face 30b of the part 30 against the shoulder 28 of the tube 26. Thus, the deformable flexible part 30 is installed in the tamping head 6 without having to resort to additional fastening elements.

The upper face 30b of the part 30 in the shape of a disk comprises a cylindrical annular projection 32, a better view of which is given in FIG. 2, which is also concentric to the upper face 30b. The projection 32 forms a sealing means between the internal tube 26 and the part 30 by resting against an inside flange 29 that is located above the shoulder 28 and/or by being fitted together in the cylindrical portion of the pipe that is located between the shoulder 28 and the flange 29.

The annular projection 32 also forms, with the studs 31, keying means that prevent a reverse installation of the flexible part 30, i.e., an installation with the upper face 30b oriented downward in the direction of the infusion chamber 14. For this purpose, the diameter of the annular projection 32 and the diameter of the portion of the internal tube 26 that is located between the shoulder 28 and the flange 29 are less than the diameter D1 (FIG. 6) of the circle on which the studs 31 are arranged.

The flexible part 30 is pierced by an orifice 35 that constitutes a passage for the infusion from the collecting chamber 25 toward the internal tube 26 in which the infusion passes in an upward direction toward a distribution output.

The orifice 35 of the part 30 is calibrated, on the one hand, to form foam in the infusion during its passage into the vertical internal tube 26 from the tamping head 6, and, on the other hand, to prevent the return of the infusion that is contained in the internal tube 26, above the part 30, toward the infusion chamber 14 after the infusion operation. For this purpose, the orifice 35 should have particular dimensions and a particular profile and the flexible part 30 should have a given deformation. Actually, the pressurized infusion that is coming from the chamber 14 should undergo an acceleration and a significant loss of pressure during its passage through the orifice 35 so as to obtain foam in the infusion jet that exits via the opening 35b of the orifice 35 in the upper face 30b. However, it is not necessary that the orifice 35 forms too large an obstacle to the flow of the infusion toward the distribution outlet, which would unacceptably lengthen the time for preparing a coffee, and would even disturb the operation of the machine. On the other hand, the characteristics of the orifice 35 and the flexible part 30 should prevent the return of the infusion into the collecting chamber 25 under the action of the weight of the infusion column that is contained in the tube 26, preferably even if a slight partial vacuum prevails in the infusion chamber 14 or a slight overpressure prevails in the internal tube 26. For this purpose, it is natural to reduce the passage section of the orifice 35.

The nonreturn function of the part 30 keeps the infusion from falling back, after the ejection of the used coffee grounds, into the empty infusion chamber 14. Actually, such a return would create vapor, since the heating block 8 remains at an elevated temperature. The vapor produced would then condense on other parts of the machine, and in particular on the grounds discharge spout. The presence of water in this discharge spout, however, would create sticking of a portion of the poured-out grounds, and even a clogging of the discharge spout after several cycles. It will be noted that the infusion that remains in the collecting chamber 25 after the infusion operation is eliminated with the used coffee grounds.

The foam-forming and nonreturn operations should therefore satisfy various constraints that require a precise calibration of the orifice 35 that can be determined using numerous tests that lead in particular to adopting the dimensional characteristics that are indicated below.

The applicant noted, however, that it was preferable to adopt an orifice 35 whose opening 35a in the lower face 30a of the part 30 has a section that is higher than that of its opening 35b in the upper face 30b. Thus, under the action of the pressure of the infusion in the collecting chamber 25, the upper face 30b of the part 30 adopts a bent profile that has the tendency to widen the upper opening 35b because of the flexibility of the material, while the lower opening 35a always forms an opening because of its larger section, even if its section has a tendency to decrease because of the deformation of the part 30. In contrast, when the pressure that is exerted on the lower face 30a of the part 30 is equal to the pressure on the upper face 30b, the section of the upper opening 35b is small enough to retain the liquid that is located above the part 30, in particular because of the capillary action phenomena. In addition, if the upper face 30b of the part 30 has a recessed profile because of a pressure difference exerted between the lower faces 30a and upper faces 30b, this deformation has a tendency to reduce the section of the upper opening 35b, optionally until the walls of the orifice 35 come into contact, which also increases the difficulty of the return of the infusion to the infusion chamber 14.

It is preferable that the orifice 35 be located at the center of the deformed zone of the part 30 during the passage of the infusion and in particular at the geometric center of the disk shape of the part 30 of the embodiments shown, so that the effect of variation of the sections of the openings (35a, 35b) is fully manifested. However, it is not absolutely necessary that the part 30 has the shape of a disk, since the deformed zone also depends on the installation of this part in the tube 26.

Figure 4:
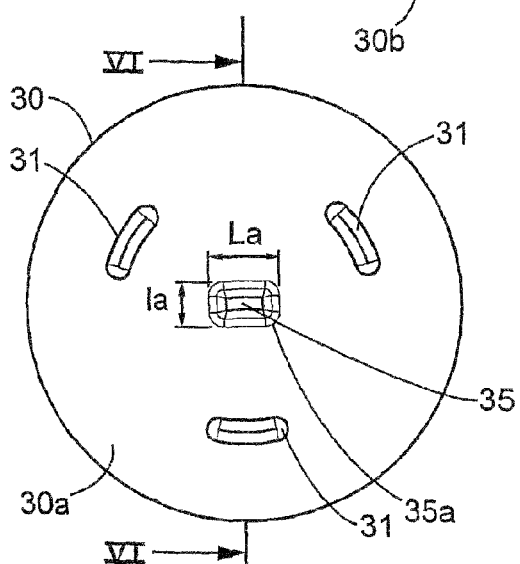
FIG. 4 is a bottom view of the flexible part along arrow IV of FIG. 3.
Figure 5:
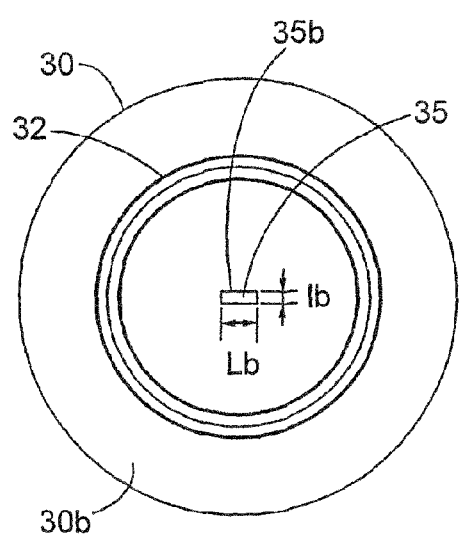
FIG. 5 is a top view of the flexible part along arrow V of FIG. 3.

In the first embodiment shown in FIGS. 1 to 6, the orifice 35 has the shape of a slightly elongated slot, i.e., whose length does not significantly exceed the width. As can be seen in FIG. 5, the opening 35b of the orifice 35 in the upper face 30b of the part 30 has a rectangular shape, while the opening 35a of said orifice 35 in the lower face 30a, visible in FIG. 4, has an overall rectangular shape with rounded corners because of the presence of a connecting shelf between the lower face 30a and the inside walls of the orifice 35. It turns out that the orifice that is thus produced in the form of a slot makes it possible to correctly perform the foam-forming and nonreturn functions.

It seems that the following dimensional characteristics of the orifice 35 make it possible to meet the operational requirements of the flexible part 30.

The opening 35a of the orifice 35 in the lower face 30a of the part 30 in the shape of a disk, visible in FIG. 4, has a width 1a of between 0.5 and 1 mm, and preferably 0.8 mm, and a length La of between 1 and 2 mm, and preferably 1.4 mm. Furthermore, the opening 35b of the orifice 35 in the upper face 30b of the part 30, visible in FIG. 5, has a width 1b of between 0.1 and 0.4 mm, and preferably 0.3 mm, and a length Lb of between 0.6 and 1.5 mm, and preferably 0.9 mm.

Figure 6:
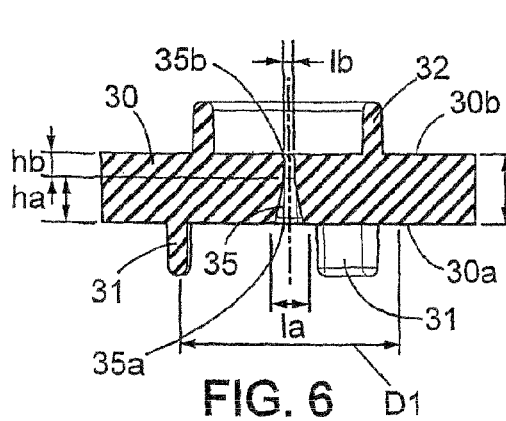
FIG. 6 is a cutaway view along line VI-VI of FIG. 4.

As can be better seen in FIG. 6, the calibrated orifice 35 has, from the lower face 30a up to the upper face 30b, a first continually decreasing section portion, followed by a second constant section portion. More particularly, the first portion of the orifice 35 has a height ha of between 1 and 1.5 mm, and preferably 1.3 mm, and the second portion of the orifice has a height hb of between 0.4 and 1 mm, and preferably 0.7 mm. The part 30 in the shape of a disk has a total height H of between 1.5 and 2.5 mm, and preferably 2 mm.

Figure 7:
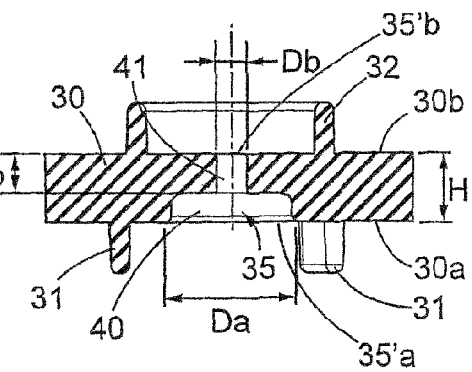
FIG. 7 is a view that is analogous to FIG. 6 of a second embodiment of the flexible part.

It is also possible to perform correctly the foam-forming and nonreturn functions despite a certain dispersion of the production sides of the flexible part 30 by adopting, for example, the second embodiment that is shown in FIG. 7. In this embodiment, the orifice 35 of the part 30 consists of a basin 40, preferably approximately circular, which forms a wide opening 35'a with a diameter Da in the lower face 30a of the part 30. The basin 40 is lengthened by a cylindrical hole 41, preferably arranged coaxially to said basin, which extends up to the upper face 30b of the part 30 so as to form an opening 35'b in the latter.

In this second embodiment, whereby the part 30 has, as above, the same height H, the cylindrical hole 41 has a height hb of between 0.6 and 1.2 mm, and preferably 0.9 mm, and a diameter Db of between 0.5 and 0.7 mm, and preferably 0.6 mm. The presence of the basin 40 imparts more flexibility to the portion of the upper face 30b into which the hole 41 empties.

Of course, the embodiments that are described are in no way limiting, and it will be noted that the deformable flexible part 30, object of the invention, can comprise one or more orifices 35 of a shape that is essentially different from those described. However, it turns out that the geometric indications given above make it possible to perform the foam-forming and nonreturn functions correctly in an efficient manner, despite the possible variations of operating conditions from one machine to the next and while adhering to the constraints linked to a large-scale industrial production.

The invention claimed is:

1. A machine for preparing an infusion, comprising:
   an infusion chamber (14) that is designed to receive a product to be infused and that is delimited by a lower vat (3) and an upper tamping head (6) that moves relative to the lower vat (3); and
   a supply of pressurized hot water to the infusion chamber (14),
   wherein said tamping head (6) comprises an internal tube (26) that has an inlet (27) that communicates with the infusion chamber (14) and that makes possible passage of the infusion through the tamping head (6) in an upward direction toward a distribution outlet, and means (30) that are located in said internal tube (26) close to its inlet (27) and suitable for forming foam in the infusion during its passage through the tamping head (6) and for preventing the infusion from returning into said infusion chamber (14), and said means are formed by a deformable flexible part (30) that is pierced by at least one calibrated orifice (35) to form the foam and to keep the infusion from returning.

2. The machine according to claim 1, wherein the flexible part (30) has a shape of a plate that has lower faces (30a) and upper faces (30b) into each of which the orifice (35) empties, and an opening (35a; 35'a) of the orifice into said lower face (30a) has a section that is larger than a section of the opening (35b; 35'b) of said orifice in said upper face (30b).

3. The machine according to claim 2, wherein the orifice (35) has a shape of an elongated slot, whereby the openings (35a, 35b) of said orifice in the lower and upper faces (30a, 30b) of the plate (30) have a rectangular section.

4. The machine according to claim 3, wherein the opening (35a) of the orifice (35) into the lower face (30a) of the plate (30) has a width (1a) that is between 0.5 and 1 mm, and a length (La) of between 1 and 2 mm, and the opening (35b) of the orifice in the upper face (30b) of the plate (30) has a width (1b) of between 0.1 and 0.4 mm, and a length (Lb) of between 0.6 and 1.5 mm.

5. The machine according to claim 4, wherein the calibrated orifice (35) has, from the lower face (30a) of the plate (30) up to the upper face (30b) of the plate (30), a first continually decreasing section portion followed by a second constant section portion.

6. The machine according to claim 5, wherein from the lower face (30a) to the upper face (30b) of the plate, the orifice (35) has a total height (H) of between 1.5 and 2.5 mm, and the first portion of the orifice has a height (ha) of between 1 and 1.5 mm, and the second portion of the orifice has a height (hb) of between 0.4 and 1 mm.

7. The machine according to claim 5, wherein from the lower face (30a) to the upper face (30b) of the plate, the orifice (35) has a total height (H) of 2 mm, and the first portion of the orifice has a height (ha) of 1.3 mm, and the second portion of the orifice has a height (hb) of 0.7 mm.

8. The machine according to claim 3, wherein the opening (35a) of the orifice (35) into the lower face (30a) of the plate (30) has a width (1a) that is 0.8 mm, and a length (La) of 1.4 mm, and the opening (35b) of the orifice in the upper face (30b) of the plate (30) has a width (1b) of 0.3 mm, and a length (Lb) of 0.9 mm.

9. The machine according to claim 2, wherein the orifice (35) comprises a circular basin (40) that extends from the lower face (30a) of the plate (30) and is lengthened by a cylindrical hole (41) that is coaxial to said basin (40) and extends up to the upper face (30b) of the plate.

10. The machine according to claim 9, wherein the cylindrical hole (41) has a height (hb) of between 0.6 and 1.2 mm, and a diameter (Db) of between 0.5 and 0.7 mm.

11. The machine according to claim 9, wherein the cylindrical hole (41) has a height (hb) of 0.9 mm, and a diameter (Db) of 0.6 mm.

12. The machine according to claim 1, wherein the flexible part (30) is made of a silicone that has a Shore hardness of between 60 and 70.

13. The machine according to claim 1, wherein the flexible part (30) has at least one keying element (32).

14. The machine according to claim 11, wherein the flexible part (30) is made of a silicone that has a Shore hardness of 65.

* * * * *